(12) United States Patent
Yagi et al.

(10) Patent No.: US 6,376,423 B2
(45) Date of Patent: *Apr. 23, 2002

(54) CATALYST FOR PREPARATION OF SYNTHESIS GAS AND PROCESS FOR PREPARING CARBON MONOXIDE

(75) Inventors: Fuyuki Yagi; Atsuro Nagumo, both of Kawasaki; Yukitaka Wada, Yokohama; Mitsunori Shimura, Yokohama; Sachio Asaoka, Yokohama; Shuhei Wakamatsu, Sagamihara, all of (JP)

(73) Assignee: Chiyoda Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/254,634

(22) PCT Filed: Apr. 13, 1998

(86) PCT No.: PCT/JP98/01686

§ 371 Date: Mar. 11, 1999

§ 102(e) Date: Mar. 11, 1999

(87) PCT Pub. No.: WO98/46523

PCT Pub. Date: Oct. 22, 1998

(30) Foreign Application Priority Data

| Apr. 11, 1997 | (JP) | 9-110436 |
| Apr. 30, 1997 | (JP) | 9-126304 |
| Jul. 31, 1997 | (JP) | 9-220092 |
| Aug. 29, 1997 | (JP) | 9-250061 |
| Aug. 29, 1997 | (JP) | 9-250062 |

(51) Int. Cl.$^7$ ............ B01J 23/40; B01J 23/42; C01B 31/18; C01B 3/26

(52) U.S. Cl. ............ 502/326; 423/418.2; 423/651; 423/653

(58) Field of Search ............ 423/418.2, 651, 423/653; 502/326, 339

(56) References Cited

U.S. PATENT DOCUMENTS

| 3,222,132 A | 12/1965 | Dowden | 423/652 |
| 4,367,166 A | 1/1983 | Fujitani et al. | 252/462 |
| 4,415,484 A | 11/1983 | Setzer et al. | 423/651 |
| 5,246,791 A | 9/1993 | Fisher et al. | 429/16 |
| 5,395,406 A | * 3/1995 | Clavenna et al. | 48/198.7 |
| 5,604,396 A | 2/1997 | Watanabe et al. | 313/485 |
| 5,614,163 A | * 3/1997 | Bhattacharyya et al. | 423/418.2 |
| 5,919,425 A | * 7/1999 | Nguyen et al. | 423/210 |

FOREIGN PATENT DOCUMENTS

| GB | 2182932 | 5/1987 |
| JP | 5849602 | 3/1983 |
| JP | 60202740 | 10/1985 |
| JP | 2227141 | 9/1990 |
| JP | 2307802 | 12/1990 |
| JP | 4331704 | 11/1992 |
| JP | 9131533 | 5/1997 |
| WO | 9424042 | 10/1994 |
| WO | 9616737 | 6/1996 |

OTHER PUBLICATIONS

Rostrup–Nielsen, J.R. "$CO_2$—Reforming of Methane Over Transition Metals", Journal of Catalysis 144, 38–49 (1993).

* cited by examiner

Primary Examiner—Steven P. Griffin
Assistant Examiner—Jonas N. Strickland
(74) Attorney, Agent, or Firm—Lorusso & Loud

(57) ABSTRACT

Disclosed are a catalyst for producing a synthesis gas using a carbon-containing organic compound as a raw material and a process for producing carbon monoxide. The catalyst for producing a synthesis gas is composed of a carrier formed of a metal oxide and at least one catalytic metal selected from rhodium, ruthenium, iridium, palladium and platinum and supported on the carrier and is characterized in that the catalyst has a specific surface area of 25 $m^2/g$ or less, in that the electronegativity of the metal ion of the carrier metal oxide is 13.0 or less and in that the amount of the supported catalytic metal is 0.0005-0.1 mole %, in terms of a metal, based on the carrier metal oxide. The process for producing carbon monoxide includes a step of reacting a carbon-containing organic compound with carbon dioxide in a pressurized condition to produce a synthesis gas, and a step of concentrating carbon monoxide in the thus obtained synthesis gas and is characterized in that the above-described catalyst is used as a catalyst in the synthesis gas producing step.

11 Claims, No Drawings

CATALYST FOR PREPARATION OF SYNTHESIS GAS AND PROCESS FOR PREPARING CARBON MONOXIDE

TECHNICAL FIELD

The present invention relates to a catalyst for producing a synthesis gas and to a process for the production of carbon monoxide.

BACKGROUND ART

A synthesis gas is a mixed gas containing hydrogen and carbon monoxide and is widely used as a raw material for the synthesis of ammonia, methanol, acetic acid, etc.

Such a synthesis gas may be produced by reaction of a hydrocarbon with steam and/or carbon dioxide in the presence of a catalyst. In the reaction, however, carbon deposition reactions occur as side reactions to cause carbon deposition which brings about a problem of catalyst poisoning.

The raw materials for the carbon deposition are a carbon-containing organic compound used as a raw material and CO produced in situ. The carbon deposition is accelerated as the partial pressures of these raw materials increase. Therefore, it is possible to reduce the amount of the carbon deposition by increasing the feed amount of steam and carbon dioxide while reducing the reaction pressure. In this case, however, it is necessary to excessively use steam and carbon dioxide in order to reduce the partial pressures of the carbon-containing organic compound and CO, so that several disadvantages are caused. For example, consumption of heat energy required for preheating steam and carbon dioxide increases. Further, costs for the separation of these gases from the product increase. Moreover, since a large reaction apparatus is required, the apparatus costs increase.

JP-A-5-208801 discloses a carbon dioxide-reforming catalyst containing a Group VIII metal supported on high purity, super-fine single crystal magnesium oxide. JP-A-6-279003 discloses a carbon dioxide-reforming catalyst containing a ruthenium compound supported on a carrier composed of a compound of at least one alkaline earth metal oxide and aluminum oxide. JP-A-9-168740 discloses a carbon dioxide-reforming catalyst containing rhodium supported on a carrier formed of a Group II-IV metal oxide or a lanthanoid metal oxide or a composite carrier composed of the above metal oxide and alumina. The reaction experiments using these catalysts are performed under ambient pressure. At a high pressure, which is industrially significant, these catalysts show a high carbon deposition activity and, hence, are not satisfactory as industrially applicable catalysts.

Carbon monoxide is widely utilized as a raw material for the synthesis of industrial products by, for example, hydroformylation. Carbon monoxide is generally produced by the reforming of methane with steam according to the reaction shown below to obtain a synthesis gas, from which carbon monoxide is subsequently separated:

$$CH_4 + H_2O \rightleftharpoons H_2 + CO.$$

In this reaction, however, only 1 mole of carbon monoxide is produced per 3 mole of hydrogen. Thus, the process for the production of carbon monoxide is not efficient. In contrast, the reforming of methane with carbon dioxide proceeds as follows:

$$CH_4 + CO_2 \rightleftharpoons 2H_2 + 2CO.$$

Thus, hydrogen and carbon monoxide are produced in an equimolar amount so that this process is more efficient than the reforming with steam. In this case, when carbon dioxide is added in excess relative to methane, carbon monoxide is produced from carbon dioxide and hydrogen by the following reverse shifting reaction:

$$CO_2 + H_2 \rightleftharpoons CO + H_2O,$$

so that the concentration of carbon monoxide in the product gas further increases. Therefore, the reforming with carbon dioxide is effective in the production of carbon monoxide. However, the product gas obtained by this reaction has a composition in an equilibrium which favors the carbon deposition, so that the catalyst used for this reaction causes considerable deactivation of the catalyst.

The objects of the present invention are:

(1) to provide a catalyst for use in a process for the production of a synthesis gas by reaction of a carbon-containing organic compound with steam and/or carbon dioxide, which catalyst has suppressed carbon deposition activity;

(2) to provide a catalyst for use in a process for the production of a synthesis gas by reaction of a carbon-containing organic compound with oxygen, which catalyst has suppressed carbon deposition activity; and (3) to provide a process which includes a step of reacting a carbon-containing organic compound with carbon dioxide to produce a synthesis gas, and a step of concentrating carbon monoxide in the thus obtained synthesis gas and which can produce carbon monoxide in an economically favorable manner by using a catalyst having suppressed carbon deposition activity in the synthesis gas producing step.

Other objects of the present invention will be understood from the following description of the specification.

DISCLOSURE OF THE INVENTION

The present inventors have made an intensive study to accomplish the above-described objects and, as a result, have completed the present invention.

In accordance with the present invention there is provided a catalyst for producing a synthesis gas comprising a carrier formed of a metal oxide and at least one catalytic metal selected from rhodium, ruthenium, iridium, palladium and platinum and supported on said carrier, characterized in that said catalyst has a specific surface area of 25 m²/g or less, in that the electronegativity of the metal ion of said carrier metal oxide is 13.0 or less and in that the amount of said supported catalytic metal is 0.0005-0.1 mole %, in terms of a metal, based on said carrier metal oxide.

The present invention also provides a process for producing carbon monoxide, which comprises a step of reacting a carbon-containing organic compound with carbon dioxide at an elevated temperature in a pressurized condition in the presence of a catalyst to produce a synthesis gas, and a step of concentrating carbon monoxide in the thus obtained synthesis gas, said process being characterized in that said catalyst comprises a carrier formed of a metal oxide and at least one catalytic metal selected from rhodium, ruthenium, iridium, palladium and platinum and supported on said carrier, in that said catalyst has a specific surface area of 25 m²/g or less, in that the electronegativity of the metal ion of said carrier metal oxide is 13.0 or less and in that the amount of said catalytic metal is 0.0005-0.1 mole %, in terms of metal, based on said carrier metal oxide.

The catalyst of the present invention is used for the production of a synthesis gas using a carbon-containing organic compound as a raw material. In this case, the processes for producing a synthesis gas include various conventionally known processes, for example, (i) a process in which a carbon-containing organic compound is reacted with steam, (ii) a process in which a carbon-containing organic compound is reacted with carbon dioxide, (iii) a process in which a carbon-containing organic compound is reacted with a mixture of steam with carbon dioxide and (iv) a process in which a carbon-containing organic compound is reacted with oxygen.

The catalyst of the present invention contains at least one catalytic metal selected from rhodium (Rh), ruthenium (Ru), iridium (Ir), palladium (Pd) and platinum (Pt) supported on a carrier metal oxide having specific characteristics. In this case, the catalytic metal can be supported in the form of a metallic state or in the form of a metal compound such as an oxide.

The catalyst of the present invention is characterized in that the catalyst has activity required for converting a carbon-containing organic compound into a synthesis gas while exhibiting a function to significantly suppress side reactions of carbon deposition reactions.

The catalyst according to the present invention can significantly suppress the carbon deposition reactions is characterized in that:
(i) the electronegativity of the metal ion of the carrier metal oxide is 13.0 or less;
(ii) the catalyst has a specific surface area of 25 m²/g or less; and
(iii) the amount of the supported catalytic metal is 0.0005-0.1 mole % based on the carrier metal oxide. Such a catalyst having a considerably suppressed carbon deposition activity has been first found by the present inventors.

The metal oxide used as a carrier may be a single metal oxide or a mixed metal oxide. In the present invention, the electronegativity of the metal ion in the carrier metal oxide is 13 or less, preferably 12 or less, more preferably 10 or less. The lower limit is about 4. Thus, the electronegativity of the metal ion in the carrier metal oxide used in the present invention is 4-13, preferably 4-12. The electronegativity of the metal ion in the metal oxide in excess of 13 is not preferable, because carbon deposition occurs significantly.

The electronegativity of the metal ion in the metal oxide is defined by the following formula:

$$Xi = (1+2i)Xo$$

wherein Xi: electronegativity of the metal ion

Xo: electronegativity of the metal i: valence electron number.

When the metal oxide is a mixed metal oxide, an average electronegativity of the metal ions is used. The average value is a sum of the products of the electronegativity of each of the metal ions contained in the mixed metal oxide by the molar fraction of the corresponding metal oxide of the mixed metal oxide.

The electronegativity (Xo) of a metal is in accordance with Pauling. The electronegativity in accordance with Pauling is as shown in "W. J. Moore Physical Chemistry, Vol. 1 translated by FUJISHIRO, Ryoichi", 4th Edition, Tokyo Kagaku Dojin, p. 707 (1974), Table 15.4.

The electronegativity of metal ion in a metal oxide is described in detail in, for example, "Syokubaikoza, vol. 2, p145 (1985) edited by Catalyst Society of Japan".

The metal oxides may include those containing one or at least two metals such as Mg, Ca, Ba, Zn, Al, Zr and La. Illustrative of such metal oxides are single metal oxides such as magnesia (MgO), calcium oxide (CaO), barium oxide (BaO), zinc oxide (ZnO), alumina ($Al_2O_3$), zirconia ($ZrO_2$) and lanthanum oxide ($La_2O_3$), and mixed metal oxides such as MgO/CaO, MgO/BaO, MgO/ZnO, MgO/$Al_2O_3$, MgO/$ZrO_2$, CaO/BaO, CaO/ZnO, CaO/$Al_2O_3$, CaO/$ZrO_2$, BaO/ZnO, BaO/$Al_2O_3$, BaO/$ZrO_2$, ZnO/$Al_2O_3$, ZnO/$ZrO_2$, $Al_2O_3$/$ZrO_2$, $La_2O_3$/MgO, $La_2O_3$/$Al_2O_3$ and $La_2O_3$/CaO.

The catalyst according to the present invention having a specific surface area of 25 m²/g or less may be obtained by calcining a carrier metal oxide before the support of a catalytic metal at 300-1,300° C., preferably 650-1,200° C. After the catalytic metal has been supported, the catalytic metal-supported carrier is further calcined at 600-1,300° C., preferably 650-1,200° C. It is also possible to obtain the catalyst by supporting a catalytic metal on a carrier metal oxide, followed by the calcination of the catalytic metal supporting product at 600-1,300° C., preferably 650-1,200° C. The upper limit of the calcination temperature is not specifically limited but is generally 1,500° C. or less, preferably 1,300° C. or less. In this case, the specific surface area of the catalyst or the carrier metal oxide can be controlled by the calcination temperature and calcination time.

The specific surface area of the catalyst or the carrier metal oxide used in the present invention is preferably 20 m²/g or less, more preferably 15 m²/g or less, most preferably 10 m²/g or less. The lower limit of the specific surface area is about 0.01 m²/g. By specifying the specific surface area of the catalyst or the carrier metal oxide in which the electronegativity of the metal ion is 13 or less in the above range, the carbon deposition activity of the catalyst can be significantly suppressed.

The amount of the catalytic metal supported on the carrier metal oxide is at least 0.0005 mole %, preferably at least 0.001 mole %, more preferably at least 0.002 mole %, in terms of metal, based on the carrier metal oxide. The upper limit is generally 0.1 mole %, preferably 0.09 mole %. In the present invention, the amount of metal supported is desirably in the range of 0.0005 -0.1 mole %, preferably 0.001-0.1 mole %.

In the catalyst of the present invention, the specific surface area of the catalyst is substantially the same as that of the carrier metal oxide. Thus, in the present specification, the term "specific surface area of a catalyst" is used as having the same meaning as "specific surface area of a carrier metal oxide thereof".

The term "specific surface area" referred to in the present specification in connection with a catalyst or a carrier metal oxide is as measured by the "BET method" at a temperature of 15° C. using a measuring device "SA-100" manufactured by Shibata Science Inc.

The catalyst according to the present invention has a small specific surface area and has an extremely small amount of a supported catalytic metal so that the carbon deposition activity thereof is considerably suppressed. Yet, the catalyst has satisfactory activity for converting a raw material carbon-containing organic compound into a synthesis gas.

The catalyst of the present invention may be prepared by conventional methods. One preferred method of preparing the catalyst of the present invention is an impregnation method. To prepare the catalyst of the present invention by the impregnation method, a catalyst metal salt or an aqueous solution thereof is added to and mixed with an aqueous dispersion containing a carrier metal oxide. The carrier metal oxide is then separated from the aqueous solution, followed by drying and calcination. A method (incipient-wetness method) is also effective in which a carrier metal oxide is added with a solution of a metal salt little by little in an amount corresponding to a pore volume to uniformly wet the surface of the carrier, followed by drying and calcination. In these methods, a water soluble salt is used as the catalyst metal salt. Such a water soluble salt may be a salt of an inorganic acid, such as a nitrate or a hydrochloride, or a salt of an organic acid, such as an acetate or an oxalate. Alternately, a metal acetylacetonate, etc. may be dissolved in an organic solvent such as acetone and the solution may be impregnated into the carrier metal oxide. The drying is performed at a temperature of 100-200° C., preferably 100-150° C. when the metal oxide is impregnated with an aqueous solution of a catalytic metal salt. When the impregnation is performed using an organic solvent, the drying is performed at a temperature higher by 50-100° C. than the boiling point of the solvent. The calcination temperature and time are adequately selected according to the specific surface area of the carrier metal oxide or catalyst obtained (the specific surface area of the catalyst). Generally, a calcination temperature in the range of 500-1,100° C. is used.

In the preparation of the catalyst of the present invention, the metal oxide used as a carrier may be a product obtained by calcining a commercially available metal oxide or a commercially available metal hydroxide. The purity of the metal oxide is at least 98% by weight, preferably at least 99% by weight. It is, however, undesirable that components which enhance carbon deposition activity or components which are decomposed under reducing conditions, such as metals, e.g. iron and nickel, and silicon dioxide ($SiO_2$). Such impurities in the metal oxide are desired to be not greater than 1% by weight, preferably not greater than 0.1% by weight.

The catalyst of the present invention may be used in various forms such as powdery, granular, spherical, columnar and cylindrical forms. The form may be appropriately selected according to the catalytic bed system used.

The production of a synthesis gas using the catalyst of the present invention may be performed by reacting a carbon-containing organic compound with steam and/or carbon dioxide ($CO_2$) or by reacting a carbon-containing organic compound with oxygen in the presence of the catalyst. As the carbon-containing organic compound, a lower hydrocarbon such as methane, ethane, propane, butane or naphtha or a non-hydrocarbon compound such as methanol or dimethyl ether may be used. The use of methane is preferred. In the present invention, a natural gas (methane gas) containing carbon dioxide is advantageously used.

In the case of a method of reacting methane with carbon dioxide ($CO_2$) (reforming with $CO_2$), the reaction is as follows:

$$CH_4 + CO_2 \rightleftarrows 2H_2 + 2CO \qquad (1)$$

In the case of a method of reacting methane with steam (reforming with steam), the reaction is as follows:

$$CH_4 + H_2O \rightleftarrows 3H_2 + CO \qquad (2)$$

In the reforming with $CO_2$, the reaction temperature is 500-1,200° C., preferably 600-1,000° C. and the reaction pressure is an elevated pressure of 5-40 kg/cm²G, preferably 5-30 kg/cm²G. When the reaction is performed with a packed bed system, the gas space velocity (GHSV) is 1,000-10,000 hr⁻¹, preferably 2,000-8,000 hr⁻¹. The amount of $CO_2$ relative to the raw material carbon-containing organic compound is 20-0.5 mole, preferably 10-1 mole, per mole of carbon of the raw material compound.

In the reforming with steam, the reaction temperature is 600-1,200° C., preferably 600-1,000° C. and the reaction pressure is an elevated pressure of 1-40 kg/cm²G, preferably 5-30 kg/cm²G. When the reaction is performed with a packed bed system, the gas space velocity (GHSV) is 1,000-10,000 hr⁻¹, preferably 2,000-8,000 hr⁻¹. The amount of steam relative to the raw material carbon-containing organic compound is 0.5-5 moles, preferably 1-2 moles, more preferably 1-1.5 moles, per mole of carbon of the raw material compound.

In the reforming with steam according to the present invention, it is possible to produce a synthesis gas in an industrially favorable manner while suppressing the carbon deposition, even when the amount of steam ($H_2O$) is maintained 2 moles or less per mole of carbon of the raw material compound. In view of the fact that 2-5 moles of steam per mole of carbon in the raw material compound is required in the conventional method, the catalyst of the present invention, which can permit the reforming reaction to smoothly proceed with an amount of steam of 2 moles or less, has a great industrial merit.

The catalyst of the present invention is favorably used as a catalyst for reacting a carbon-containing organic compound with a mixture of steam and $CO_2$. In this case, the mixing proportion of steam and $CO_2$ is not specifically limited but is generally such as to provide a $H_2O/CO_2$ molar ratio of 0.1-10.

When a carbon-containing organic compound is reacted with oxygen using the catalyst of the present invention, the carbon-containing organic compound may be such a hydrocarbon or non-hydrocarbon organic compound as described previously and is preferably methane. As the source of oxygen, there may be used oxygen, air or oxygen-rich air. In the present invention a natural gas (methane gas) containing carbon dioxide is advantageously used as a reaction raw material.

In the case of the reaction of methane with oxygen, the reaction is as shown below:

$$CH_4 + \tfrac{1}{2}O_2 \rightleftarrows CO + 2H_2 \qquad (3)$$

In partial oxidation of the carbon-containing organic compound, the reaction temperature is 500-1,500° C., preferably 700-1,200° C. and the reaction pressure is an elevated pressure of 5-50 kg/cm²G, preferably 10-40 kg/cm²G. When the reaction is performed with a packed bed system, the gas space velocity (GHSV) is 1,000-50,000 hr⁻¹, preferably 2,000-20,000 hr⁻¹. The amount of oxygen relative to the raw material carbon-containing organic compound is such as provide a molar ratio of carbon of the raw material carbon-containing organic compound to oxygen molecules $C/O_2$ of 4-0.1 mole, preferably 2-0.5 mole. Since the partial oxidation method is a greatly exothermic reaction, it is possible to adopt a reaction system of autothermic system while adding steam and carbon dioxide to the raw material.

The above-described various reactions using the catalyst of the present invention may be carried out with various catalyst systems such as a packed bed system, a fluidized bed system, a suspension bed system and a moving bed system.

A process for the production of carbon monoxide according to the present invention includes, as a first step, a synthesis gas producing step. The first step is carried out by reacting a carbon-containing organic compound with carbon dioxide in the presence of a catalyst. In this case, the previously described catalyst is used as the synthesis gas production catalyst.

In the reaction of the carbon-containing organic compound with carbon dioxide (reforming with $CO_2$), the reaction temperature is 500-1,200° C., preferably 600-1,000° C.

and the reaction pressure is an elevated pressure of 1-40 kg/cm$^2$G, preferably 5-30 kg/cm$^2$G. When the reaction is performed with a packed bed system, the gas space velocity (GHSV) is 1,000-10,000 hr$^{-1}$, preferably 2,000-8,000 hr$^{-1}$. The amount of carbon dioxide relative to the raw material carbon-containing organic compound is 1-10 moles, preferably 1-5 moles, more preferably 1-3 moles, per mole of carbon of the raw material compound.

In the reforming with $CO_2$ according to the present invention, a synthesis gas can be produced in an industrially advantageous manner while preventing carbon deposition, even when the amount of $CO_2$ is maintained no more than 3 moles per mole of carbon of the raw material compound.

The above-described reforming with $CO_2$ may be carried out with various catalyst systems such as a packed bed system, a fluidized bed system, a suspension bed system and a moving bed system and is preferably performed using a packed bed system.

As a result of the above-described reforming with $CO_2$, a synthesis gas containing hydrogen and carbon monoxide is obtained. When methane is used as a raw material, the synthesis gas has, for example, a composition containing 10-30 vol % of $H_2$, 35-45 vol % of CO, 5-40 vol % of unreacted $CO_2$, 0-30 vol % of unreacted $CH_4$ and 5-20 vol % of $H_2O$.

In the second step of the present invention, the thus obtained synthesis gas is used as a raw material and carbon monoxide (CO) is concentrated therefrom. The CO concentration may be carried out by a customarily employed CO concentration method such as a cryogenic separation and a absorption method using an aqueous copper salt solution as an absorbent.

EXAMPLE

The present invention will be further described in detail below by examples.

Catalyst Preparation Example 1

The particle size of aluminum oxide calcined at 650° C. for 1.5 h (hour) in air was adjusted to 0.27-0.75 mm. Thereafter, Ru was supported on the aluminum oxide by an impregnation method (incipient-wetness method). This was further calcined at 1,000° C. in air to obtain a Ru-supporting $Al_2O_3$ catalyst (Ru content was 3.0×10$^{-4}$ g per 1 g of $Al_2O_3$ and, in terms of molar amount, 0.03 mol %). The above impregnated material was obtained by adding dropwise an aqueous solution of ruthenium(III) chloride extremely little by little to the calcined $Al_2O_3$, with mixing by shaking after each dropwise addition. The Ru concentration in the aqueous solution of ruthenium(III) chloride added dropwise was 0.05% by weight. The impregnated material was dried at 120° C. for 2.5 h in air and calcined at 1,000° C. for 1.5 h in the same atmosphere to obtain the Ru-supporting $Al_2O_3$ catalyst (surface area: 18.6 m$^2$/g). The electronegativity Xi of $Al^{3+}$ of $Al_2O_3$ is 11.3.

Catalyst Preparation Example 2

The particle size of zirconium oxide calcined at 600° C. for 2 h in air was adjusted to 0.27-0.75 mm. Thereafter, Rh was supported on the zirconium oxide by an impregnation method. This was further calcined at 970° C. in air to obtain a Rh-supporting $ZrO_2$ catalyst (Rh content was 8.4×10$^{-6}$ g per 1 g of $ZrO_2$ and, in terms of molar amount, 0.001 mol %). The above impregnated material was obtained by adding dropwise an aqueous solution of rhodium(III) acetate extremely little by little to the calcined $ZrO_2$, with mixing by shaking after each dropwise addition. The Rh concentration in the aqueous solution of rhodium(III) acetate added dropwise was 0.0065% by weight. The impregnated material was dried at 120° C. for 2.5 h in air and calcined at 970° C. for 2 h in the same atmosphere to obtain the Rh-supporting $ZrO_2$ catalyst (surface area: 8.6 m$^2$/g). The electronegativity Xi of $Zr^{4+}$ of $ZrO_2$ is 12.0.

Catalyst Preparation Example 3

The particle size of magnesium oxide (magnesia) calcined at 600° C. for 2 h in air was adjusted to 0.27-0.75 mm. Thereafter, Rh was supported on the magnesium oxide by an impregnation method. This was further calcined at 1,100° C. in air to obtain a Rh-supporting MgO catalyst (Rh content was 2.6×10$^{-3}$ g per 1 g of Mg and, in terms of molar amount, 0.1 mol %). The above impregnated material was obtained by adding dropwise an aqueous solution of rhodium(III) acetate extremely little by little to the calcined MgO, with mixing by shaking after each dropwise addition. The Rh concentration in the aqueous solution of rhodium(III) acetate added dropwise was 1.7% by weight. The impregnated material was dried at 120° C. for 2.5 h in air and calcined at 1,100° C. for 2 h in the same atmosphere to obtain the Rh-supporting MgO catalyst (surface area: 0.6 m$^2$/g). The electronegativity Xi of $Mg^{2+}$ of MgO is 6.6.

Catalyst Preparation Example 4

Rh was supported on magnesium oxide (in the form of ⅛ inch pellets), calcined at 1,100° C. for 3 h in air, by an impregnation method. This was further calcined at 400° C. in air to obtain a Rh-supporting MgO catalyst (Rh content was 1.5×10$^{-3}$ g per 1 g of MgO and, in terms of molar amount, 0.06 mol %). The above impregnated material was obtained by soaking the calcined MgO pellets in an aqueous solution of rhodium(III) acetate having a Rh concentration of 1.0% by weight for about 3 h. The impregnated material was then dried at 120° C. for 2.5 h in air and calcined at 400° C. for 3 h in the same atmosphere to obtain the Rh-supporting MgO catalyst (surface area: 0.7 m$^2$/g). The electronegativity Xi of $Mg^{2+}$ of MgO is 6.6.

Catalyst Preparation Example 5

Rh was supported on magnesium oxide (in the form of ⅛ inch pellets), calcined at 1,100° C. for 3 h in air, by an impregnation method. This was further calcined at 1,000° C. in air to obtain a Rh-supporting MgO catalyst (Rh content was 2.6×10$^{-5}$ g per 1 g of MgO and, in terms of molar amount, 0.001 mol %). The above impregnated material was obtained by soaking the calcined MgO pellets in an acetone solution of rhodium(III) acetylacetonate having a Rh concentration of 0.017% by weight for about 3 h. The impregnated material was then dried at 120° C. for 2.5 h in air and calcined at 1,000° C. for 3 h in the same atmosphere to obtain the Rh-supporting MgO catalyst (surface area: 0.6 m$^2$/g). The electronegativity Xi of $Mg^{2+}$ of MgO is 6.6.

Catalyst Preparation Example 6

Rh was supported on magnesium oxide (in the form of ⅛ inch pellets), containing 5 mol % of calcium oxide and calcined at 1,100° C. for 3 h in air, by an impregnation method. This was further calcined at 950° C. in air to obtain a Rh-supporting CaO/MgO catalyst (Rh content was 7.5×10$^{-4}$ g per 1 g of CaO/MgO and, in terms of molar amount, 0.03 mol). The above impregnated material was obtained by soaking the calcined CaO/MgO pellets in an aqueous solution of rhodium(III) acetate having a Rh concentration of 0.5% by weight for about 3 h. The impregnated material was then dried at 120° C. for 2.5 h in air and calcined at 950° C. for 3 h in the same atmosphere to obtain the Rh-supporting CaO/MgO catalyst (surface area: 0.8 m$^2$/g) The average electronegativity Xi of the metal ions of the carrier is 6.5.

Catalyst Preparation Example 7

Rh was supported on magnesium oxide (in the form of ⅛ inch pellets), containing 10 mol % of lanthanum oxide and calcined at 1,100° C. for 3 h in air, by an impregnation method. This was further calcined at 950° C. in air to obtain a Rh-supporting La$_2$O$_3$/MgO catalyst (Rh content was 9.0× 10$^{-5}$ g per 1 g of La$_2$O$_3$/MgO and, in terms of molar amount, 0.006 mol %). The above impregnated material was obtained by soaking the calcined La$_2$O$_3$/MgO pellets in an acetone solution of rhodium(III) acetylacetonate having a Rh concentration of 0.1% by weight for about 3 h. The impregnated material was then dried at 120° C. for 2.5 h in air and calcined at 950° C. for 3 h in the same atmosphere to obtain the Rh-supporting La$_2$O$_3$/MgO catalyst (surface area: 0.8 m$^2$/g). The average electronegativity Xi of the metal ions of the carrier is 6.7.

Catalyst Preparation Example 8

The particle size of magnesium oxide calcined at 1,000° C. for 1.5 h in air was adjusted to 0.27-0.75 mm. Thereafter, Rh was supported on the magnesium oxide by an impregnation method. This was further calcined at 950° C. in air to obtain a Rh-supporting MgO catalyst (Rh content was 2.6×10$^{-4}$ g per 1 g of MgO and, in terms of molar amount, 0.01 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.17% by weight. The Rh-impregnated material was dried at 120° C. for 2.5 h in air and calcined at 950° C. for 1.5 h in the same atmosphere to obtain the Rh-supporting MgO catalyst (surface area: 5.8 m$^2$/g).

Catalyst Preparation Example 9

The particle size of magnesium oxide calcined at 920° C. for 2 h in air was adjusted to 0.27-0.75 mm. Thereafter, Ru was supported on the magnesium oxide by an impregnation method. This was further calcined at 920° C. in air to obtain a Ru-supporting MgO catalyst (Ru content was 1.5×10$^{-3}$ g per 1 g of MgO and, in terms of molar amount, 0.06 mol %). The above impregnated material was obtained by adding dropwise an aqueous solution of hydrated ruthenium(III) chloride extremely little by little to the calcined MgO, with mixing by shaking after each dropwise addition. The rhodium(III) chloride aqueous solution had a Ru concentration of 1.0% by weight. The Rh-impregnated material was dried at 120° C. for 2.5 h in air and calcined at 920° C. for 2 h in the same atmosphere to obtain the Rh-supporting MgO catalyst (surface area: 9.6 m$^2$/g).

Catalyst Preparation Example 10

The particle size of magnesium oxide calcined at 300° C. for 3 h in air was adjusted to 0.27-0.75 mm. Thereafter, Ir was supported on the magnesium oxide by an impregnation method. This was further calcined at 600° C. in air to obtain a Ir-supporting MgO catalyst (Ir content was 4.8×10$^{-3}$ g per 1 g of MgO and, in terms of molar amount, 0.10 mol %). The above impregnated material was obtained by adding dropwise an aqueous solution of iridium(IV) chloride extremely little by little to the calcined MgO, with mixing by shaking after each dropwise addition. The iridium(IV) chloride aqueous solution had a Ir concentration of 3.2% by weight. The Rh-impregnated material was dried at 120° C. for 2.5 h in air and calcined at 600° C. for 3 h in the same atmosphere to obtain the Ir-supporting MgO catalyst (surface area: 24.8 m$^2$/g).

Catalyst Preparation Example 11

The particle size of magnesium oxide calcined at 500° C. for 3 h in air was adjusted to 0.27-0.75 mm. Thereafter, Pt was supported on the magnesium oxide by an impregnation method. This was further calcined at 750° C. in air to obtain a Pt-supporting MgO catalyst (Pt content was 4.8×10$^{-3}$ g per 1 g MgO and, in terms of molar amount, 0.10 mol %). The above impregnated material was obtained by adding dropwise an aqueous solution of chloroplatinic acid ([H$_2$PtCl$_6$]) extremely little by little to the calcined MgO, with mixing by shaking after each dropwise addition. The chloroplatinic acid aqueous solution had a Pt concentration of 3.2% by weight. The Pt-impregnated material was dried at 120° C. for 2.5 h in air and calcined at 750° C. for 3 h in the same atmosphere to obtain the Pt-supporting MgO catalyst (surface area: 18.4 m$^2$/g).

Catalyst Preparation Example 12

The particle size of magnesium oxide calcined at 300° C. for 3 h in air was adjusted to 1.2-2.5 mm. Thereafter, Rh was supported on the magnesium oxide by an impregnation method. This was further calcined at 950° C. in air to obtain a Rh-supporting MgO catalyst (Rh content was 1.0×10$^{-3}$ g per 1 g of MgO and, in terms of molar amount, 0.04 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.68% by weight. The Rh-impregnated material was dried at 120° C. for 2.5 h in air and calcined at 950° C. for 3 h in the same atmosphere to obtain the Rh-supporting MgO catalyst (surface area: 6.0 m$^2$/g)

Catalyst Preparation Example 13

The particle size of magnesium oxide calcined at 930° C. for 3 h in air was adjusted to 0.27-0.75 mm. Thereafter, Ru was, supported on the magnesium oxide by an impregnation method. This was further calcined at 970° C. in air to obtain a Ru-supporting MgO catalyst (Ru content was 7.5×10$^{-4}$ g per 1 g of MgO and, in terms of molar amount, 0.03 mol %). The above impregnated material was obtained by adding dropwise an aqueous solution of ruthenium(III) chloride extremely little by little to the calcined MgO, with mixing by shaking after each dropwise addition. The ruthenium(III) chloride aqueous solution had a Ru concentration of 0.50% by weight. The Ru-impregnated material was dried at 120° C. for 2.5 h in air and calcined at 970° C. for 3 h in the same atmosphere to obtain the Ru-supporting MgO catalyst (surface area: 5.2 m$^2$/g).

Catalyst Preparation Example 14

The particle size of magnesium oxide calcined at 350° C. for 3 h in air was adjusted to 0.27-0.75 mm. Thereafter, Rh was supported on the magnesium oxide by an impregnation method. This was further calcined at 1,050° C. in air to obtain a Rh-supporting MgO catalyst (Rh content was $2.0 \times 10^{-3}$ g per 1 g of Mg and, in terms of molar amount, 0.08 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.3% by weight. The Rh-impregnated material was dried at 120° C. for 2.5 h in air and calcined at 1,050° C. for 3 h in the same atmosphere to obtain the Rh-supporting MgO catalyst (surface area: 1.5 m$^2$/g)

Catalyst Preparation Example 15

The particle size of magnesium oxide calcined at 950° C. for 3 h in air was adjusted to 0.27-0.75 mm. Thereafter, Ru was supported on the magnesium oxide by an impregnation method. This was further calcined at 950° C. in air to obtain a Ru-supporting MgO catalyst (Ru content was $2.5 \times 10^{-4}$ g per 1 g of MgO and, in terms of molar amount, 0.01 mol %). The above impregnated material was obtained by adding dropwise an aqueous solution of ruthenium(III) chloride hydrate extremely little by little to the calcined MgO, with mixing by shaking after each dropwise addition. The ruthenium(III) chloride hydrate aqueous solution had a Ru concentration of 0.17% by weight. The Ru-impregnated material was dried at 120° C. for 2.5 h in air and calcined at 950° C. for 3 h in the same atmosphere to obtain the Ru-supporting MgO catalyst (surface area: 4.8 m$^2$/g). In this case, Ru was found to be supported as ruthenium oxide.

Catalyst Preparation Example 16

The particle size of magnesium oxide calcined at 300° C. for 3 h in air was adjusted to 0.27-0.75 mm. Thereafter, Rh was supported on the magnesium oxide by an impregnation method. This was further calcined at 1,050° C. in air to obtain a Rh-supporting MgO catalyst (Rh content was $2.3 \times 10^{-3}$ g per 1 g of MgO and, in terms of molar amount, 0.09 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.5% by weight. The Rh-impregnated material was dried at 120° C. for 2.5 h in air and calcined at 1,050° C. for 3 h in the same atmosphere to obtain the Rh-supporting MgO catalyst (surface area: 2.0 m$^2$/g). In this case, Rh was found to be supported as rhodium oxide.

Catalyst Preparation Example 17

The particle size of magnesium oxide calcined at 1,000° C. for 3 h in, air was adjusted to 0.27-0.75 mm. Thereafter, Rh was supported on the magnesium oxide by an impregnation method. This was further calcined at 950° C. in air to obtain a Rh-supporting MgO catalyst (Rh content was $1.5 \times 10^{-4}$ g per 1 g of MgO and, in terms of molar amount, 0.006 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.1% by weight. The Rh-impregnated material was dried at 120° C. for 2.5 h in air and calcined at 950° C. for 3 h in the same atmosphere to obtain the Rh-supporting MgO catalyst (surface area: 5.6 m$^2$/g).

Catalyst Preparation Example 18

The particle size of magnesium oxide calcined at 500° C. for 3 h in air was adjusted to 0.27-0.75 mm. Thereafter, Rh and Pt were supported on the magnesium oxide by an impregnation method. This was further calcined at 1,050° C. in air to obtain a Rh- and Pt-supporting MgO catalyst (Rh and Pt contents were $1.8 \times 10^{-3}$ g and $4.8 \times 10^{-4}$ g, respectively, per 1 g of MgO and, in terms of molar amount, 0.07 and 0.01 mol %, respectively). The above impregnated material was obtained by adding dropwise an aqueous solution of rhodium(III) and chloroplatinic acid ([$H_2PtCl_6$]) acetate extremely little by little to the calcined MgO, with mixing by shaking after each dropwise addition. The mixed aqueous solution had Rh and Pt concentrations of 1.2% by weight and 0.32% by weight, respectively. The Rh- and Pt-impregnated material was dried at 120° C. for 2.5 h in air and calcined at 1,050° C. for 3 h in the same atmosphere to obtain the Rh- and Pt-supporting MgO catalyst (surface area: 1.4 m$^2$/g)

Comparative Catalyst Preparation Example 1

The particle size of magnesium oxide calcined at 370° C. for 3 h in air was adjusted to 0.27-0.75 mm. Thereafter, Rh was supported on the magnesium oxide by an impregnation method. This was further calcined at 370° C. in air to obtain a Rh-supporting MgO catalyst (Rh content was $2.6 \times 10^{-3}$ g per 1 g of MgO and, in terms of molar amount, 0.10 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.7% by weight. The Rh-impregnated material was dried at 120° C. for 2.5 h in air and calcined at 370° C. for h in the same atmosphere to obtain the Rh-supporting MgO catalyst (surface area: 98 m$^2$/g).

Reaction Example 1

The catalyst (5 cc) obtained in Catalyst Preparation Example 1 was packed in a reactor to perform a test of reforming methane with $CO_2$.

The catalyst was previously subjected to a reduction treatment at 900° C. for 1 h in a $H_2$ stream to convert oxidized Rh into metallic Rh. A raw material gas having a molar ratio of $CH_4:CO_2=1:1$ was then treated at a temperature of 850° C. and a pressure of 20 kg/cm$^2$G and with GHSV (methane basis) of 4,000 hr$^{-1}$. The $CH_4$ conversion at 5 h after the commencement of the reaction was 55% (equilibrium $CH_4$ conversion under the experimental condition=55%), and the $CH_4$ conversion at 100 h after the commencement of the reaction was 54%. The term "$CH_4$ conversion" herein is defined by the following formula:

$$CH_4 \ Conversion \ (\%) = (A-B)/A \times 100$$

A: mole number of $CH_4$ in the raw material
B: mole number of $CH_4$ in the product.

Reaction Example 2

The catalyst (5 cc) obtained in Catalyst Preparation Example 2 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:1$ was then treated at a temperature of 870° C. and a pressure of 10 kg/cm$^2$G and with GHSV (methane basis) of 2,000 hr$^{-1}$. The $CH_4$ conversion at 5 h after the commencement of the reaction was 71% (equilibrium $CH_4$ conversion under the experimental condition=71%), and the $CH_4$ conversion at 50 h after the commencement of the reaction was 71%.

Reaction Example 3

The catalyst (5 cc) obtained in Catalyst Preparation Example 3 was packed in a reactor to perform a methane reforming test.

The catalyst was previously subjected to a reduction treatment at 900° C. for 1 h in a $H_2$ stream. A raw material gas having a molar ratio of $CH_4:CO_2:H_2O=1:0.5:1.0$ was then treated at a temperature of 850° C. and a pressure of 20 kg/cm²G and with GHSV (methane basis) of 4,000 hr$^{-1}$. The $CH_4$ conversion at 5 h after the commencement of the reaction was 61.5% (equilibrium $CH_4$ conversion under the experimental condition=62%), and the $CH_4$ conversion at 400 h after the commencement of the reaction was 61.0%.

Reaction Example 4

The catalyst (20 cc) obtained in Catalyst Preparation Example 4 was packed in a reactor to perform a methane reforming test.

The catalyst was previously subjected to a reduction treatment at 900° C. for 1 h in a $H_2$ stream to convert oxidized Rh into metallic Rh. A raw material gas having a molar ratio of $CH_4:CO_2:H_2O=1:0.5:1.0$ was then treated at a temperature of 850° C. and a pressure of 20 kg/cm²G and with GHSV (methane basis) of 3,500 hr$^{-1}$. The $CH_4$ conversion at 5 h after the commencement of the reaction was 61.0% (equilibrium $CH_4$ conversion under the experimental condition=62.0%), and the $CH_4$ conversion at 280 h after the commencement of the reaction was 61.0%.

Reaction Example 5

The catalyst (20 cc) obtained in Catalyst Preparation Example 5 was packed in a reactor to perform a test of reforming methane with $H_2O$.

The catalyst was previously subjected to a reduction treatment at 900° C. for 1 h in a $H_2$ stream. A raw material gas having a molar ratio of $CH_4:H_2O=1:2$ was then treated at a temperature of 850° C. and a pressure of 20 kg/cm²G and with GHSV (methane basis) of 2,000 hr$^{-1}$. The $CH_4$ conversion and the $H_2/CO$ molar ratio of the product gas at 5 h after the commencement of the reaction were 72.0% (equilibrium $CH_4$ conversion under the experimental condition=71%) and 4.6, respectively, and the $CH_4$ conversion at 280 h after the commencement of the reaction was 71.8%.

Reaction Example 6

The catalyst (20 cc) obtained in Catalyst Preparation Example 6 was packed in a reactor to perform a test of reforming methane with $H_2O$.

The catalyst was previously subjected to a reduction treatment at 900° C. for 1 h in a $H_2$ stream. A raw material gas having a molar ratio of $CH_4: H_2O=1:1$ was then treated at a temperature of 850° C. and a pressure of 20 kg/cm²G and with GHSV (methane basis) of 5,500 hr$^{-1}$. The $CH_4$ conversion and the $H_2/CO$ molar ratio of the product gas at 5 h after the commencement of the reaction were 52.2% (equilibrium $CH_4$ conversion under the experimental condition=52.3%) and 3.8, respectively, and the $CH_4$ conversion at 250 h after the commencement of the reaction was 52.0%.

Reaction Example 7

The catalyst (20 cc) obtained in Catalyst Preparation Example 7 was packed in a reactor to perform a test of reforming methane with $CO_2$.

The catalyst was previously subjected to a reduction treatment at 920° C. for 1 h in a $H_2$ stream. A raw material gas having a molar ratio of $CH_4:CO_2=1:1$ was then treated at a temperature of 850° C. and a pressure of 20 kg/cm²G and with GHSV (methane basis) of 4,000 hr$^{-1}$. The $CH_4$ conversion at 5 h after the commencement of the reaction was 54.0% (equilibrium $CH_4$ conversion under the experimental condition=55%), and the $CH_4$ conversion at 380 h after the commencement of the reaction was 53.5%.

Reaction Example 8

The catalyst (5 cc) obtained in Catalyst Preparation Example 8 was packed in a reactor to perform a test of reforming methane with $CO_2$.

The catalyst was previously subjected to a reduction treatment at 900° C. for 1 h in a $H_2$ stream to convert oxidized Rh into metallic Rh. A raw material gas having a molar ratio of $CH_4:CO_2=1:1$ was then treated at a temperature of 850° C. and a pressure of 20 kg/cm²G and with GHSV (methane basis) of 4,000 hr$^{-1}$. The $CH_4$ conversion at 5 h after the commencement of the reaction was 55% (equilibrium $CH_4$ conversion under the experimental condition=55%), and the $CH_4$ conversion at 320 h after the commencement of the reaction was 54%.

Reaction Example 9

The catalyst (5 cc) obtained in Catalyst Preparation Example 9 was packed in a reactor to perform a test of reforming methane with $CO_2$.

The catalyst was previously subjected to a reduction treatment at 900° C. for 1 h in a $H_2$ stream. A raw material gas having a molar ratio of $CH_4: CO_2=1:1$ was then treated at a temperature of 870° C. and a pressure of 10 kg/cm²G and with GHSV (methane basis) of 6,000 hr$^{-1}$. The $CH_4$ conversion at 5 h after the commencement of the reaction was 71% (equilibrium $CH_4$ conversion under the experimental condition=71%), and the $CH_4$ conversion at 520 h after the commencement of the reaction was 71%.

Reaction Example 10

The catalyst (5 cc) obtained in Catalyst Preparation Example 10 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:1$ was then treated at a temperature of 830° C. and a pressure of 5 kg/cm²G and with GHSV (methane basis) of 2,500 hr$^{-1}$. The $CH_4$ conversion at 5 h after the commencement of the reaction was 73% (equilibrium $CH_4$ conversion under the experimental condition=73%), and the $CH_4$ conversion at 100 h after the commencement of the reaction was 71%.

Reaction Example 11

The catalyst (5 cc) obtained in Catalyst Preparation Example 11 was packed in a reactor to perform a methane reforming test.

The catalyst was previously subjected to a reduction treatment at 900° C. for 1 h in a $H_2$ stream. A raw material gas having a molar ratio of $CH_4:CO_2:H_2O=1:0.5:0.5$ was then treated at a temperature of 880° C. and a pressure of 10 kg/cm²G and with GHSV (methane basis) of 3,000 hr$^{-1}$. The $CH_4$ conversion at 5 h after the commencement of the reaction was 70% (equilibrium $CH_4$ conversion under the experimental condition=70%), and the $CH_4$ conversion at 120 h after the commencement of the reaction was 67%.

Reaction Example 12

Example 8 was repeated in the same manner as described except that steam was used in lieu of $CO_2$. The $CH_4$ conversions at 5 h and 320 h after the commencement of the reaction were 52% and 51%, respectively.

Reaction Example 13

The catalyst (5 cc) obtained in Catalyst Preparation Example 12 was packed in a reactor to perform a test of partial oxidation of methane.

The catalyst was previously subjected to a reduction treatment at 850° C. for 1 h in a $H_2$ stream. A raw material gas having a molar ratio of $CH_4:O_2=1:0.5$ was then treated at a temperature of 800° C. and a pressure of 20 kg/cm$^2$G and with GHSV (methane basis) of 5,000 hr$^{-1}$. The $CH_4$ conversion at 5 h after the commencement of the reaction was 55% (equilibrium $CH_4$ conversion under the experimental condition=56%), and the $CH_4$ conversion at 200 h after the commencement of the reaction was 53%.

Reaction Example 14

The catalyst (5 cc) obtained in Catalyst Preparation Example 13 was packed in a reactor to perform a test of partial oxidation of methane.

The catalyst was previously subjected to a reduction treatment at 800° C. for 1 h in a $H_2$ stream. A raw material gas having a molar ratio of $CH_4:O_2=1:0.5$ was then treated at a temperature of 750° C. and a pressure of 15 kg/cm$^2$G and with GHSV (methane basis) of 4,000 hr$^{-1}$. The $CH_4$ conversion at 5 h after the commencement of the reaction was 52% (equilibrium $CH_4$ conversion under the experimental condition=52%), and the $CH_4$ conversion at 150 h after the commencement of the reaction was 50%.

Reaction Example 15

The catalyst (5 cc) obtained in Catalyst Preparation Example 14 was packed in a reactor to perform a test of partial oxidation of methane.

The catalyst was previously subjected to a reduction treatment at 1,100° C. for 1 h in a $H_2$ stream. A raw material gas having a molar ratio of $CH_4:O_2:H_2O=1:0.5:0.5$ was then treated at a temperature of 1,000° C. and a pressure of 20 kg/cm$^2$G and with GHSV (methane basis) of 5,000 hr$^{-1}$. The $CH_4$ conversion at 5 h after the commencement of the reaction was 93% (equilibrium $CH_4$ conversion under the experimental condition=94%), and the $CH_4$ conversion at 100 h after the commencement of the reaction was 93%.

Reaction Example 16

Using two interconnected reactors, an automthermal reforming test was carried out. A raw material gas having a molar ratio of $CH_4:O_2=1:0.25$ was fed to a first reactor with GHSV (based on a catalyst contained in a second reactor) of 6,000 hr$^{-1}$ and subjected to a combustion reaction at a temperature of 950° C. and a pressure of 25 kg/cm$^2$G. To the second reactor, a gas discharged from the first reactor, oxygen and carbon dioxide were added (molar ratio of $CH_4$ (as raw material $CH_4$ fed to the first reactor):$O_2:CO_2=$ 1:0.25:0.5), so that a reforming reaction was carried out using the catalyst (5 cc) obtained in Catalyst Preparation Example 17. The catalyst was previously subjected to a reduction treatment at 950° C. for 1 h in a $H_2$ stream. The reaction conditions included a temperature of 850° C. and a pressure of 25 kg/cm$^2$G. After 5 h from the commencement of the reaction, the $CH_4$ conversion was 71.8% and the contents of $H_2$ and CO in the product gas were 33.8 mol % and 30.0 mol %, respectively. The $CH_4$ conversion at 200 h after the commencement of the reaction was 71.6%.

Reaction Example 17

Using two interconnected reactors, an autothermal reforming test was carried out. A raw material gas having a molar ratio of $CH_4:O_2=1:0.5$ was fed to a first reactor with GHSV (based on a catalyst contained in a second reactor) of 5,000 hr$^{-1}$ and subjected to a combustion reaction at a temperature of 1,050° C. and a pressure of 25 kg/cm$^2$G. To the second reactor, a gas discharged from the first reactor and carbon dioxide were added (molar ratio of $CH_4$(as raw material $CH_4$ fed to the first reactor) :$CO_2=1:0.5$) so that a reforming reaction was carried out using the catalyst (5 cc) obtained in Catalyst Preparation Example 18. The catalyst was previously subjected to a reduction treatment at 850° C. for 1 h in a $H_2$ stream. The reaction conditions included a temperature of 700° C. and a pressure of 20 kg/cm$^2$G. After 5 h from the commencement of the reaction, the $CH_4$ conversion was 46.7% and the contents of $H_2$ and CO in the product gas were 19.6 mol % and 16.1 mol %, respectively. The $CH_4$ conversion at 150 h after the commencement of the reaction was 46.5%.

Comparative Reaction Example 1

A test of reforming methane with $CO_2$ was performed in the same manner as described in Reaction Example 1 except that the catalyst (5 cc) prepared in Comparative Catalyst Preparation Example 1 was used. In this case, the $CH_4$ conversions at 5 h and 15 h after the commencement of the reaction were 40% and 8%, respectively.

Comparative Reaction Example 2

A test of reforming methane with $H_2O$ was performed in the same manner as described in Reaction Example 6 except that the catalyst prepared in Comparative Catalyst Preparation Example 1 was used. In this case, the $CH_4$ conversions at 5 h and 20 h after the commencement of the reaction were 45% and 10%, respectively.

Comparative Reaction Example 3

A reaction experiment was performed in the same manner as described in Reaction Example 13 except that the catalyst prepared in Comparative Catalyst Preparation Example 1 was used. In this case, the $CH_4$ conversions at 5 h and 40 h after the commencement of the reaction were 13% and 9%, respectively.

Reaction Example 18

The catalyst (5 cc) obtained in Catalyst Preparation Example 17 was packed in a reactor to perform a test of reforming methane with $CO_2$.

The catalyst was previously subjected to a reduction treatment at 900° C. for 1 h in a $H_2$ stream to convert oxidized Rh into metallic Rh. A raw material gas having a molar ratio of $CH_4:CO_2=1:3$ was then treated at a temperature of 850° C. and a pressure of 25 kg/cm$^2$G and with GHSV (methane basis) of 6,000 hr$^{-1}$. After 5 h from the commencement of the reaction, the $CH_4$ conversion was 86.1% (equilibrium $CH_4$ conversion under the experimental condition=86.1%) and the $CO/H_2$ molar ratio of the product gas was 2.2. The $CH_4$ conversion at 280 h after the commencement of the reaction was 85.7%.

Reaction Example 19

The catalyst (5 cc) obtained in Catalyst Preparation Example 7 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:5$ was then treated at a temperature of 830° C. and a pressure of 20 kg/cm²G and with GHSV (methane basis) of 5,500 hr$^{-1}$. After 5 h from the commencement of the reaction, the $CH_4$ conversion was 95.7% (equilibrium $CH_4$ conversion under the experimental condition=95.8%) and the $CO/H_2$ molar ratio of the product gas was 3.2. The $CH_4$ conversion at 400 h after the commencement of the reaction was 95.4%.

Reaction Example 20

The catalyst (5 cc) obtained in Catalyst Preparation Example 9 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:1$ was then treated at a temperature of 800° C. and a pressure of 20 kg/cm²G and with GHSV (methane basis) of 4,000 hr$^{-1}$. After 5 h from the commencement of the reaction, the $CH_4$ conversion was 45.5% (equilibrium $CH_4$ conversion under the experimental condition=45.5%) and the $CO/H_2$ molar ratio of the product gas was 1.6. The $CH_4$ conversion at 150 h after the commencement of the reaction was 45.2%.

Comparative Reaction Example 4

Methane reforming with $CO_2$ was repeated in the same manner as described in Reaction Example 20 except that 5 cc of the catalyst obtained in Comparative Catalyst Preparation Example 1 was used. After 5 h from the commencement of the reaction, the $CH_4$ conversion was 42.0% (equilibrium $CH_4$ conversion under the experimental condition=45.5%) and the $CO/H_2$ molar ratio of the product gas was 1.7. The $CH_4$ conversion at 15 h after the commencement of the reaction was 5.0%.

CO Concentration Example 1

The synthesis gas obtained in Reaction Example 18 and having a $CO/H_2$ molar ratio of 2.2 was concentrated by an absorption method using a CuCl solution acidified with hydrochloric acid as an absorbent, thereby obtaining concentrated CO having CO concentration of 96%.

The catalyst according to the present invention shows considerably suppressed carbon deposition activity, while retaining activity required for converting a carbon-containing organic compound into a synthesis gas. By using the catalyst of the present invention, therefore, a synthesis gas can be produced continuously with a good yield for a long period of time while preventing carbon deposition.

Further, the use of the catalyst of the present invention can effectively suppress the carbon deposition even at a high pressure, so that a small size apparatus of producing a synthesis gas can be used and the device costs can be reduced.

In the process for the production of carbon monoxide according to the present invention, the above-described specific catalyst is used in a synthesis gas producing step. This catalyst shows considerably suppressed carbon deposition activity while retaining the activity required for converting a carbon-containing organic compound into a synthesis gas. Therefore, the synthesis gas producing step of the present invention can continuously produce a synthesis gas for a long period of time with a good yield while preventing carbon deposition.

Further, the use of the catalyst of the present invention can effectively suppress the carbon deposition even at a high pressure and with a small amount of $CO_2$ feed, so that a small size apparatus of producing a synthesis gas can be used and the device costs can be reduced.

Moreover, since the synthesis gas obtained in the synthesis gas production step has a small content of $CO_2$, the concentration of CO can be efficiently performed with a small-sized device.

What is claimed is:

1. A catalyst for producing a synthesis gas comprising a carrier formed of a metal oxide and at least one catalytic metal selected from rhodium, ruthenium, iridium, palladium and platinum and supported on said carrier, characterized in that said catalyst has a specific surface area of 25 m²/g or less, in that the electronegativity of the metal ion of said carrier metal oxide is 13.0 or less and in that the amount of said supported catalytic metal is 0.0005 -0.1 mole %, in terms of a metal, based on said carrier metal oxide.

2. A catalyst according to claim 1, wherein said catalytic metal is rhodium and/or ruthenium.

3. A catalyst according to claim 1 or 2, wherein the electronegativity of the metal ion of said metal oxide carrier is 4-12.

4. A catalyst according to any one of claims 1-3, wherein the specific surface area of said catalyst is 0.01-10 m²/g.

5. A catalyst according to any one of claims 1-4, wherein said metal oxide carrier is magnesium oxide.

6. A process for producing carbon monoxide, which comprises a step of reacting a carbon-containing organic compound with carbon dioxide at an elevated temperature in a pressurized condition in the presence of a catalyst to produce a synthesis gas, and a step of concentrating carbon monoxide in the thus obtained synthesis gas, said process being characterized in that said catalyst comprises a carrier formed of a metal oxide and at least one catalytic metal selected from rhodium, ruthenium, iridium, palladium and platinum and supported on said carrier, in that said catalyst has a specific surface area of 25 m²/g or less, in that the electronegativity of the metal ion of said carrier metal oxide is 13.0 or less and in that the amount of said catalytic metal is 0.0005 -0.1 mole %, in terms of metal, based on said carrier metal oxide.

7. A process according to claim 6, wherein said catalytic metal is rhodium and/or ruthenium.

8. A process according to any one of claims 6 or 7, wherein the electronegativity of the metal ion of said metal oxide carrier is 4-12.

9. A process according to any one of claims 6-8, wherein the specific surface area of said catalyst is 0.01-10 m²/g.

10. A process according to any one of claims 6-9, wherein said metal oxide carrier is magnesium oxide.

11. A process according to any one of claims 6-10, wherein said carbon-containing organic compound is methane.

* * * * *

UNITED STATES PATENT AND TRADEMARK OFFICE
CERTIFICATE OF CORRECTION

PATENT NO. : 6,376,423 B2
DATED : April 23, 2002
INVENTOR(S) : Yagi et al.

It is certified that error appears in the above-identified patent and that said Letters Patent is hereby corrected as shown below:

Column 6,
Line 35, "$CH_4 + 1/2O_2 \leftrightarrows CO + 2H_2$" should read -- $CH_4 + 1/2O_2 \leftrightarrows CO + 2H_2$ --.

Column 18,
Lines 19-63, substitute the following claims 1-11 as printed:

1. A catalyst for producing a synthesis gas, said catalyst consisting essentially of a carrier consisting essentially of magnesium oxide and at least one catalytic metal selected from rhodium and ruthenium and supported on said carrier in an amount of 0.001-0.08 mole %, based on the magnesium of said magnesium oxide, said catalyst having a specific surface area of 5.8 $m^2/g$ or less.

2. A process for producing carbon monoxide, which comprises:
  reacting a carbon-containing organic compound with carbon dioxide in a molar ratio of carbon dioxide to carbon in the carbon-containing organic compound of 1.0-3.0, at a temperature of 600-1000°C, at a pressure of 5-40 $Kg/cm^2G$, and at a GHSV of 1000-10,000 $hr^{-1}$ in the presence of a catalyst to produce a synthesis gas containing the carbon monoxide, and
  concentrating the carbon monoxide in the thus obtained synthesis gas,
  wherein said catalyst consists essentially of a carrier consisting essentially of magnesium oxide and at least one catalytic metal selected from rhodium and ruthenium and supported on said carrier in an amount of 0.001-0.08 mole %, based on said magnesium oxide, said catalyst having a specific surface area of 5.8 $m^2/g$ or less.

3. A catalyst according to claim 1, wherein the specific surface area of said catalyst is 0.01-1.5 $m^2/g$.

4. A catalyst according to claim 3, wherein said carrier contains at least 98 % by weight of magnesium oxide and no more than 1.0% by weight of impurities selected from the group consisting of Fe, Ni, $SiO_2$ and mixtures thereof.

UNITED STATES PATENT AND TRADEMARK OFFICE
CERTIFICATE OF CORRECTION

PATENT NO.     : 6,376,423 B2
DATED          : April 23, 2002
INVENTOR(S)    : Yagi et al.

It is certified that error appears in the above-identified patent and that said Letters Patent is hereby corrected as shown below:

5. A catalyst according to claim 1, wherein said carrier contains at least 98 % by weight of magnesium oxide and no more than 1.0% by weight of impurities selected from the group consisting of Fe, Ni, SiO and mixtures thereof.

6. A catalyst according to claim 1, wherein said carrier is obtained by calcining magnesium oxide at a temperature of 950-1,300°C.

7. A process according to claim 2, wherein the specific surface area of said catalyst is 0.01-1.5 $m^2/g$.

8. A process according to claim 7, wherein said carrier contains at least 98 % by weight of magnesium oxide and no more than 1.0% by weight of impurities selected from the group consisting of Fe, Ni, $SiO_2$ and mixtures thereof.

9. A process according to claim 2, wherein said carrier contains at least 98 % by weight of magnesium oxide and no more than 1.0% by weight of impurities selected from the group consisting of Fe, Ni, $SiO_2$ and mixtures thereof.

10. A process according to claim 2, wherein said carrier is obtained by calcining magnesium oxide at a temperature of 950-1,300°C.

UNITED STATES PATENT AND TRADEMARK OFFICE
CERTIFICATE OF CORRECTION

PATENT NO.   : 6,376,423 B2
DATED        : April 23, 2002
INVENTOR(S)  : Yagi et al.

It is certified that error appears in the above-identified patent and that said Letters Patent is hereby corrected as shown below:

11. A process according to claim 2, wherein said carbon-containing organic compound is natural gas.

Signed and Sealed this

Eighth Day of April, 2003

JAMES E. ROGAN
*Director of the United States Patent and Trademark Office*